Aug. 25, 1964 KAZUO NAGAOKA 3,145,894

MAGNETIC RECORDER

Filed April 9, 1962 2 Sheets-Sheet 1

Inventor
Kazuo Nagaoka

Hill, Sherman, Meroni, Gross & Simpson
Attorneys.

Inventor
Kazuo Nagaoka
Hill, Sherman, Meroni, Gross & Simpson
Attorneys.

United States Patent Office 3,145,894

Patented Aug. 25, 1964

3,145,894
MAGNETIC RECORDER

Kazuo Nagaoka, Nakano-ku, Tokyo, Japan, assignor to Sony Corporation, Tokyo, Japan, a corporation of Japan Filed Apr. 9, 1962, Ser. No. 185,970
Claims priority, application Japan Apr. 14, 1961
5 Claims. (Cl. 226—180)

This invention relates to a magnetic recording system and device therefor.

An object of this invention is to provide a novel magnetic recording and reproducing system using a particular arrangement of the relative position of a capstan and a pinch-roller to a magnetic tape for driving, at a constant speed, the magnetic tape which is stretched from a supply reel through a magnetic head portion to a take-up reel.

Another object of this invention is to provide a novel magnetic tape driving system and device therefor when recording and reproducing, in which a pinch-roller is placed at a lower position than a capstan and brought up into the regular contact with the capstan when required.

A further object of this invention is to provide a magnetic recorder which is suitable for use in small size, and in which a concavity is formed in a fly-wheel for constant speed rotation connected directly to the capstan and a pinch-roller shifting device is disposed in this concavity thus improving space factor.

A still further object of this invention is to provide a tape recorder in which a magnetic tape can easily be set at its driving position.

Other objects, features and advantages of this invention will become apparent from the following description taken in conjunction with the accompanying drawings in which FIGURE 1 is a schematic diagram illustrating a magnetic recording system heretofore used;

Figure 1:
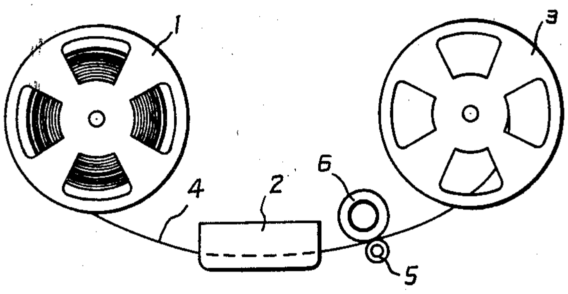

Referring now to the drawings, one example of a magnetic tape recorder according to this invention will hereinafter be explained.

In FIGURE 1, 1 is a supply reel, 2 a magnetic head portion, 3 a take-up reel, a magnetic medium, namely a magnetic tape 4 being stretched through the magnetic head portion 2. When recording on the magnetic tape or reproducing therefrom, the magnetic tape 4 is generally transported at a constant speed by a capstan 5 and a pinch-roller 6 which are disposed between the magnetic head portion 2 and the take-up reel 3 as shown in FIGURE 1. That is, the capstan 5 and the pinch-roller 6 are usually placed in such a relative position to the magnetic tape that the latter makes contact with the magnetic layer and the former with the base layer of the tape. However, it is theoretically possible that the relative position of the capstan 5 and the pinch-roller 6 to the magnetic tape 4 is reversed, namely the capstan and pinch-roller may well make contact with either side of the magnetic tape.

Figure 2:
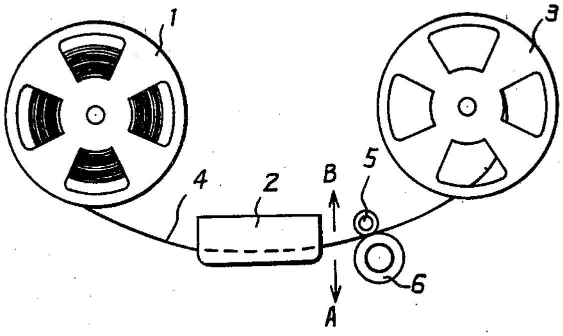
FIGURE 2 is a schematic diagram showing a magnetic recording system according to this invention.

In this invention, the magnetic tape 4 is always driven having its magnetic layer in contact with the capstan 5 as shown in FIGURE 2.

Figure 3:
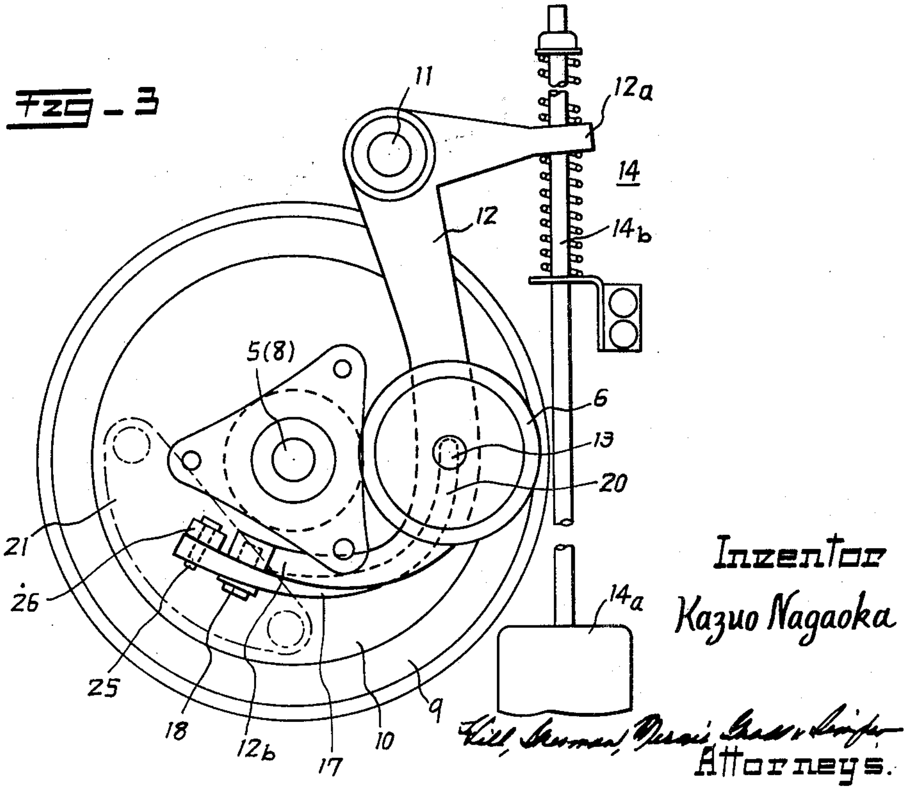
FIGURE 3 is a plan view illustrating the essential part of a magnetic tape recorder according to this invention.
Figure 4:
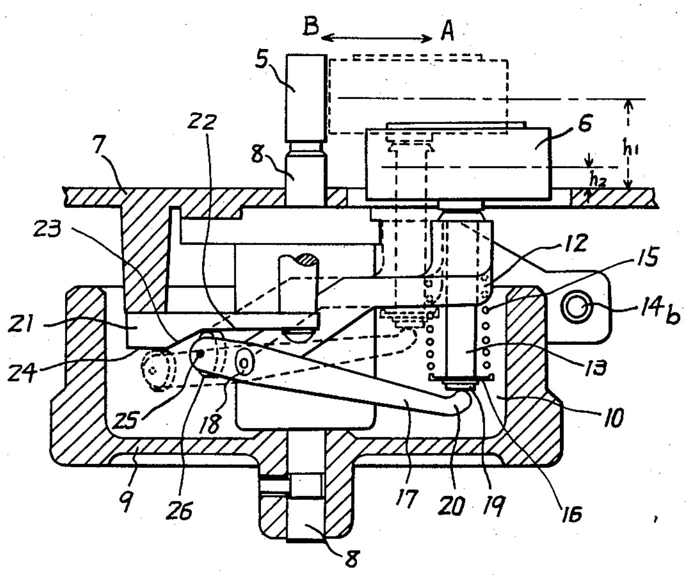
FIGURE 4 is a side sectional view showing one part thereof.

Generally speaking, if the direction of the base layer of the magnetic tape 4 is presumed to be the front A of the magnetic tape recorder, the pinch-roller 6 is disposed in the front A and and the capstan 5 is provided in the rear B with respect to the magnetic layer of the magnetic tape 4, thus the capstan 5 and the pinch-roller 6 standing opposite to each other across the tape 4. Advantages of this structure will become apparent from the following description. With reference to FIGURE 3 and 4 an embodiment of this invention will hereinbelow be described. 7 is a panel, on which the capstan 5 is mounted extending upwardly therefrom and this capstan 5 is directly connected to a fly-wheel 9 by its shaft 8. A concavity 10 is formed on the fly-wheel centering around its shaft, because a driving mechanism of the pinch-roller hereinafter described is disposed in the concavity thereby increasing space factor.

The driving mechanism of the pinch-roller will hereinbelow be explained. When driving the magnetic tape 4 by cooperating with the capstan 5 and the pinch-roller 6, the standard height of the pinch-roller 6, for example, the height $h_1$ from the panel 7 is substantially the same as that of the capstan 5. In a magnetic tape recorder heretofore employed, when the magnetic tape 4 is not driven by the capstan and the pinch roller, the pinch-roller 6 is only apart from the capstan 5 at the same horizontal plane and shifted horizontally only in movement, and accordingly the height $h_1$ of the pinch roller 6 is always substantially the same as that of the capstan. This implies that the movement of the pinch-roller to the capstan is made only in a horizontal level at the height $h_1$.

In this invention, however, the pinch-roller 6 is brought down away from the capstan 5 at least by the width of a magnetic tape 4 or more. In FIGURE 4, $h_2$ is a height from the panel 7 when pinch-roller 6 is brought down.

It is very advantageous to bring down the pinch-roller 6, coupled with the fact that the relative position of the capstan 5 and the pinch-roller 6 to the magnetic tape 4 is reversed as described above in connection with FIGURE 2, contrary to the conventional one illustrated in FIGURE 1. That is, when stretching the magnetic tape 4 from the supply reel 1 through the magnetic head portion 2 to the take-up reel 3, if the pinch-roller 6 is brought down, there is no hindrance in front of the magnetic tape recorder so that the magnetic tape 4 can easily be hitched on the capstan 5 from the front. The advantage that the magnetic tape is stretched from the front is due to that the supply reel 1 and take-up reel 3 are positioned in rear of the magnetic head portion 2. This is apparent from the fact that the magnetic tape naturally comes into contact with the capstan.

An embodiment of this invention will hereinbelow be explained. The pinch-roller 6 is rotatable on a shaft 13 mounted on a free end of a rotary arm 12 which is journalled on a fixed shaft 11, from which the rotary arm 12 extends inwardly under the panel 7. This rotary arm 12 may be formed, for instance, L shape as shown in FIGURE 3 and its free end 12*a* is associated with a switching mechanism 14 of the magnetic tape recorder. FIGURE 3 shows an example wherein the free end 12*a* is connected with a shaft 14*b* of a plunger mechanism 14*a*.

In operation, the rotary arm 12 is rotated in the horizontal plane, thereby horizontally shifting the shaft 13 of the pinch-roller 6 towards the shaft 8 of the capstan 5. Further, the shaft 13 of the pinch-roller 6 is extended downwards from the rotary arm 12 and a spring 15 is interposed between the free end of the shaft 13 and the undersurface of the rotary arm 12, thus holding the pinch-roller 6 at the height $h_2$ lower than the capstan 5. In the figure, a spring receiver 16 is provided at the free end of the shaft 13 and the spring 15 is interposed between the receiver 16 and the rotary arm 12. The shaft 13 is placed in the concavity of the fly-wheel 9 all the time when the rotary arm is rotating. When the shaft 13 is brought up to the height $h_1$ against the spring 15, the pinch-roller 6 cooperates with the capstan 5 to drive the magnetic tape 4.

Means for vertically lifting up the shaft 13 as the rotary arm 12 rotates will be hereinbelow described. The rotary arm 12 is extended and a lifting lever 17 is rotatably pivoted on the free end of the extended arm **12*b* with a shaft 18. The extended arm 12*b* may be formed surrounding the capstan shaft 8 and is disposed rotatably in the concavity of the fly-wheel 9**.

A free end of the lifting lever 17 abuts against, for example, the lower end 19 of the shaft 13 of the pinch-roller. 20 is an abutting portion of the lever 17 to the end 19. The other free end of the lifting lever 17 abuts against a fixed cam 21. The cam 21 is provided with a plane which brings down the shaft 13 of the pinch-roller 6 to the lowest position when the cam face 22 and the free end of the lifting lever are associated with each other at the initial position, an inclined plane 23 which rotates the lifting lever 17 so as to gradually bring up the shaft 13, and a horizontal plane which brings up the shaft 13 to the uppermost position, namely a cam face 24 holds the pinch-roller 6 at the height $h_1$. Of course, the cam 21 is formed along a locus of the free end of the lifting lever 17 which is mounted on the rotary arm **12*b*. In the figure, the free end of the lifting lever 17 abutting against the cam 21 is provided with a roller 26 which is pivoted on a shaft 25** for smooth abutment.

With such an arrangement as described above, by rotating the rotary arm 12 by means of the switching mechanism 14 when the pinch-roller 6 is placed at the position illustrated by full lines the shaft 13 of the pinch-roller 6 is caused to move horizontally towards the axis of the capstan 5. At the same time, as the free end of the lifting lever 17 is associated with the cam 21, the shaft 13 of the pinch-roller 6 is lifted up against the spring 15, accordingly due to the movements of both the rotary arm 12 and lifting lever 17 the pinch-roller 6 comes into contact with the capstan 5 as shown by dotted lines. Thus, it is one of the greatest features of this invention that the pinch-roller 6 is held at a lower position than the capstan 5 in the initial position of the rotary arm 12. Consequently, when stretching the magnetic tape 4 through the magnetic head portion, there is no hindrance in front of the magnetic tape 4, so that the magnetic tape can easily be brought into contact with the capstan 5.

Furthermore, this invention is characterized in that the movement of the pinch roller 6 is based on a resultant motion of the horizontal movement of the rotary arm 12 and the vertical one of the shaft 13. The vertical moving mechanism does not affect the contact pressure between the capstan 5 and the pinch-roller 6, because the free end of the lifting lever 17 abuts against the horizontal plane 24 of the cam 21.

It will be apparent that many modifications and variations may be effected without departing from the scope of the novel concepts of this invention.

What is claimed is:

1. A magnetic tage recorder comprising tape driving means consisting of a pinch-roller and a capstan cooperating with each other, said pinch-roller having an axis of rotation substantially parallel to the axis of rotation of said capstan but being disposed apart from said capstan in a different level from that of said capstan when a magnetic tape is held undriven, and means for shifting said pinch-roller to the level of said capstan and simultaneously moving said pinch-roller towards said capstan while at all times maintaining the axis of rotation of said pinch-roller parallel to the axis of the capstan to make contact therewith when said magnetic tape is driven.

2. A magnetic tape recorder comprising a supply reel, a take-up reel, a magnetic head disposed between said supply reel and said take-up reel, a magnetic tape consisting of a non-magnetic base layer and a magnetic layer attached thereon, tape driving means consisting of a pinch-roller and a capstan, said magnetic layer of said magnetic tape being contacted with said capstan, said pinch-roller having an axis of rotation substantially parallel to the axis of rotation of said capstan but being disposed apart from said capstan in a lower level than said capstan when said magnetic tape is held undriven, and means for lifting said pinch-roller up to the level of said capstan and simultaneously moving said pinch-roller towards said capstan while at all times maintaining the axis of rotation of said pinch-roller parallel to the axis of the capstan to make contact therewith when said magnetic tape is driven.

3. A magnetic tape recorder comprising tape driving means consisting of a pinch-roller and a capstan cooperating with each other, said pinch-roller being disposed apart from said capstan in a lower level than said capstan when a magnetic tape is held undriven, a rotary arm which is pivoted so as to be rotated in a horizontal plane, a vertical shaft having said pinch-roller which is journalled on said rotary arm, and means engaging said shaft for moving the shaft vertically without changing the vertical orientation of said shaft so that said pinch-roller is lifted up to the same level of said capstan when said magnetic tape is driven.

4. A magnetic tape recorder comprising a supply reel, a take-up reel, a magnetic head disposed between said supply reel and said take-up reel, a magnetic tape consisting of a non-magnetic base layer and a magnetic layer attached thereon, tape driving means consisting of a pinch-roller and a capstan, said magnetic layer of said magnetic tape being contacted with said capstan, said pinch-roller being disposed apart from said capstan in a lower level than said capstan when said magnetic tape is held undriven, a rotary arm which is pivoted so as to be rotated in a horizontal plane, a vertical shaft journalled on said rotary arm, said pinch-roller being rotatably mounted on the upper end of said vertical shaft, a lever to lift said vertical shaft so that said pinch-roller is lifted up to the same level of said capstan, and connection means for establishing the horizontal movement of said rotary arm and the vertical movement of said vertical shaft when said magnetic tape is driven.

5. A tape recorder comprising a panel, tape driving means comprising a capstan at one side of said panel and extending substantially at right angles to said panel, said capstan having a shaft extending through said panel and a cup shaped flywheel secured to said shaft on the opposite side of said panel from said capstan, said flywheel having an annular cavity about said shaft and an open end adjacent said panel, an arm extending generally parallel to the panel between the flywheel and panel, a pinch-roller having a shaft carried by said arm and mounting said pinch-roller for rotation on its central axis, said shaft having its axis disposed at right angles to said panel and being mounted for axial reciprocation by said arm, said arm having a pivot axis disposed substantially at right angles to said panel, said panel having a cam disposed within the cavity of said flywheel, said cam having first and second cam faces extending generally parallel to said panel at different distances therefrom and a third cam face connecting said first and second cam faces, said first, second and third cam faces providing a path extending arcuately with respect to the pivot axis of said arm, a lever pivotally carried by said arm within said cavity of said flywheel and having one free end carrying a roller for riding on said first, second and third cam faces and having an opposite free end engageable with the shaft of the pinch-roller to control the axial reciprocation thereof, means for moving said arm about its pivot axis from a first angular position to a second angular position, said roller on said one end of said lever engaging said first cam face in the first angular position of said arm to hold said lever in a first angular position and engaging said second cam face in the second angular position of said arm to hold said lever in a second angular position, said panel having an aperture therein adjacent said capstan and said pinch-roller having its axis parallel to the capstan but offset therefrom a distance substantially greater than the radius of the pinch-roller and being partially within the aperture in said panel in the first position of said arm, said roller riding on said second cam face in the second position of said arm to maintain said lever in said second angular position and to hold said pinch-roller at a distance from said panel corresponding to the distance of said capstan from said panel for engagement of a tape between said capstan and pinch-roller, said pinch-roller having its axis parallel to said capstan throughout its range of swinging movement with said arm to insure that the tape will be engaged by the pinch-roller with the axis of the shaft parallel to the axis of rotation of the capstan, and the aperture in said panel having a dimension in the direction of a plane through the capstan and pinch-roller axes approximately equal to the diameter of the pinch-roller.

References Cited in the file of this patent

UNITED STATES PATENTS

| | | |
|---|---|---|
| 2,876,005 | Eash | Mar. 3, 1959 |
| 2,922,642 | Cousino | Jan. 26, 1960 |
| 2,953,312 | Munroe | Sept. 20, 1960 |
| 2,985,395 | Hoehn et al. | May 23, 1961 |
| 3,023,943 | Schober | Mar. 6, 1962 |
| 3,027,112 | Flan | Mar. 27, 1962 |
| 3,080,101 | Kreithen et al. | Mar. 5, 1963 |